US006899807B2

(12) United States Patent
Cummings

(10) Patent No.: US 6,899,807 B2
(45) Date of Patent: May 31, 2005

(54) SOLID AND LIQUID SEPARATION DEVICE

(76) Inventor: Sophia Cummings, 101-5704 Balsam Street, Vancouver, British Columbia (CA), V6M 4B9

( * ) Notice: Subject to any disclaimer, the term of this patent is extended or adjusted under 35 U.S.C. 154(b) by 35 days.

(21) Appl. No.: 10/447,005

(22) Filed: May 29, 2003

(65) Prior Publication Data
US 2003/0230520 A1 Dec. 18, 2003

(30) Foreign Application Priority Data

May 30, 2002 (CA) .............................................. 2388259

(51) Int. Cl.[7] .................................................. B01D 29/64
(52) U.S. Cl. ......................... 210/97; 210/106; 210/408; 210/409; 210/413; 210/528; 210/531
(58) Field of Search ................................. 210/770, 791, 210/86, 97, 104, 105, 106, 408, 409, 413, 528, 531

(56) References Cited

U.S. PATENT DOCUMENTS

| 5,832,873 | A | 11/1998 | Tu |
| 6,357,576 | B1 * | 3/2002 | Enomoto .................... 198/495 |
| 6,494,167 | B1 | 12/2002 | Chen |
| 6,695,122 | B2 * | 2/2004 | Enomoto .................... 198/495 |
| 2003/0230520 | A1 * | 12/2003 | Cummings .................... 210/85 |

FOREIGN PATENT DOCUMENTS

CA    2354984    * 12/2002    ........... B01D/29/64

* cited by examiner

Primary Examiner—Robert James Popovics
(74) Attorney, Agent, or Firm—Oyen Wiggs Green & Mutala

(57) ABSTRACT

A solid and liquid separation device, comprising: a housing, the housing having an inlet, a solid outlet and a liquid outlet, the liquid outlet located in a lower portion of the housing; a screen located within the housing, the screen positioned above the liquid outlet at an inclined angle, wherein a lower end of the screen is directly below the inlet; a conveying assembly, mounted in the housing located above the screen, and including two rotation shafts co-operating with two drive members, a plurality of connecting rods mounted between the two drive chains, each drive chain comprising at least one longitudinally flexible link, each connecting rod including a scraper, the scraper capable of contacting the screen for driving solids toward an upper end of the screen; and, a squeeze assembly, including a cylinder for supporting solids falling from the upper end of the screen, the cylinder provided with a threaded rod that is configured to be driven to rotate by a power member, the threaded rod capable of outputting the solids toward the solid outlet.

22 Claims, 9 Drawing Sheets

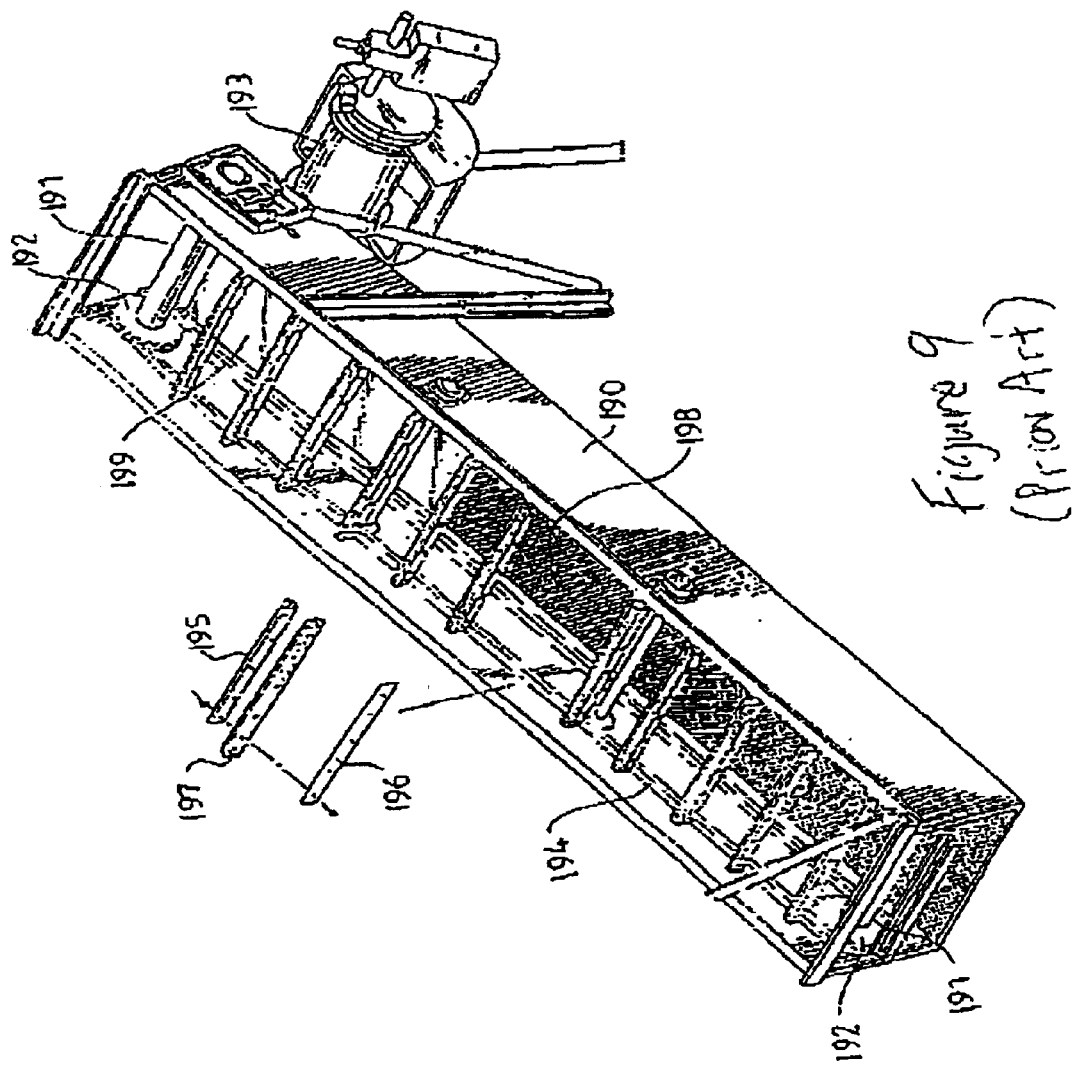

SOLID AND LIQUID SEPARATION DEVICE

TECHNICAL FIELD

The invention relates to separation of solids and liquids, and for particularly to devices for separating solids from liquids.

BACKGROUND

Waste materials such as manure typically comprise both liquid and solid components. The solid components are useful for compost, fertilizer and fuel. Solid components used for compost may contain some moisture, but it is generally undesirable for solid components used for fuel to have more than a trace of moisture.

The liquid components must be properly treated to minimize health risks which would arise if the liquid components of manure found their way into the water supply. There are numerous prior art examples of devices which are used for separating the solid and liquid components of manure.

The closest prior art of which the applicant is aware is disclosed in U.S. Pat. No. 5,832,873, entitled "Solid and Liquid Separation Machine", and is shown in FIG. 8. The separation machine includes a body 190 having two ends respectively provided with a rotation shaft 191 and a drive gear 192. One rotation shaft 191 is driven to rotate by the motor 193. A chain 194 is mounted between the two drive gears 192. A scraper 197 is secured on the chain 194 by a fixing plate 195 and a locking plate 196, for carrying upward the solids contained in the waste water, and squeezing the water contained in the solids. The front section of the bottom of the body 190 is provided with a bottom net 198, and the rear section of the bottom of the body 190 is provided with a bottom plate 199.

The squeezed solids are then carried upward by the scraper 197 to drop into a collecting tank. However, when the solids are carried upward by the scraper 197, the bottom net 198 is easily blocked by the solids, thereby greatly affecting the water filtering effect, and thereby causing inconvenience in operation and increasing the cost of maintenance. In addition, when the atmospheric temperature is decreased to 0° C., the liquid will freeze. Thus, the solid and liquid separation machine cannot conveniently separate the solid from the liquid.

SUMMARY OF INVENTION

The invention provides a solid and liquid separation device, comprising: a housing, the housing having an inlet, a solid outlet and a liquid outlet, the liquid outlet located in a lower portion of the housing; a screen located within the housing, the screen positioned above the liquid outlet at an inclined angle, wherein a lower end of the screen is directly below the inlet; a conveying assembly, mounted in the housing located above the screen, and including two rotation shafts co-operating with two drive members, at least one of the rotation shafts connected to the housing by two tension assemblies, a plurality of connecting rods mounted between the two drive members, each connecting rod including a scraper, the scraper capable of contacting the screen for driving solids toward an upper end of the screen; and, a squeeze assembly, including a trough for supporting solids falling from the upper end of the screen, the trough provided with an auger that is configured to be driven to rotate by a power member, the auger capable of outputting the solids toward the solid outlet.

Each tension assembly comprises a spring, an adjustment screw, or both.

The power member pay be capable of driving the auger at a plurality of different speeds of rotation.

The solid and liquid separation device may further comprise a brushing assembly mounted in the housing located below the screen, the brushing assembly comprising two rotation shafts cooperating with two drive members, a plurality of connecting rods mounted between the two drive members, each connecting rod including a brush, the brush configured to remove solid components of material caught in the screen.

The invention also provides a solid and liquid separation device, comprising: a housing, the housing having an inlet, a solid outlet and a liquid outlet, the liquid outlet located in a lower portion of the housing; a screen located within the housing, the screen positioned above the liquid outlet at an inclined angle, wherein a lower end of the screen is directly below the inlet; a conveying assembly, mounted in the housing located above the screen, and including two rotation shafts cooperating with two drive members, a plurality of connecting rods mounted between the two drive members, each connecting rod including a scraper, the scraper capable of contacting the screen for driving solids toward an upper end of the screen; a squeeze assembly, including a trough for supporting solids falling from the upper end of the screen, the trough provided with an auger that is configured to be driven to rotate by a power member, the auger capable of outputting the solids toward the solid outlet; a plurality of nozzles arranged for spraying liquid toward a top of the screen and toward the squeeze assembly; a sensor configured to produce an output signal indicative of whether material is being introduced into the housing through the inlet; and, a control panel configured to receive the output signal from the sensor, the control panel connected to activate the plurality of nozzles when the output signal indicates that no material has been introduced into the housing through the inlet for a predetermined period of time.

At least one of the rotation shafts may be connected to the housing by two tension assemblies. Each tension assembly may comprise a spring, an adjustment screw or both.

The housing may be provided with doors that may be opened and closed, for assembling, dismantling and maintenance of parts in the housing.

The solid and liquid separation device may further comprise a heater mounted in the housing above the conveying assembly.

The housing may be provided with an overflow outlet, so that excessive material introduced into the housing through the inlet may be drawn out, and may be introduced again through the inlet.

The housing may comprise a generally V-shaped floor, and the liquid outlet may be located at the bottom of the generally V-shaped floor.

The auger may comprise a tapered end portion. The tapered end portion may extend out of the housing through the solid outlet. The solid and liquid separation device may further comprise an auger cap attached to the housing, the auger cap positioned over the tapered end. The auger cap may comprise a truncated conical screen fitted around the tapered end. The auger cap may also comprise a solid discharge chute.

The invention also provides a method of separating liquids and solids comprising: introducing material comprising both liquid and solid components into a top portion of a housing, the top portion separated from a bottom portion of the housing by an inclined screen; urging the material along the screen towards an upper end of the screen; providing a squeeze assembly positioned in the housing below the upper end of the screen; squeezing the material in the squeeze assembly; and, urging the squeezed material out of the housing through a solid outlet.

BRIEF DESCRIPTION OF DRAWINGS

FIG. 9 is an isometric view of a prior art device.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The invention provides a device for separating liquids and solids. The liquid portion of the material is separated from the solid portion of the material.

Figure 1:
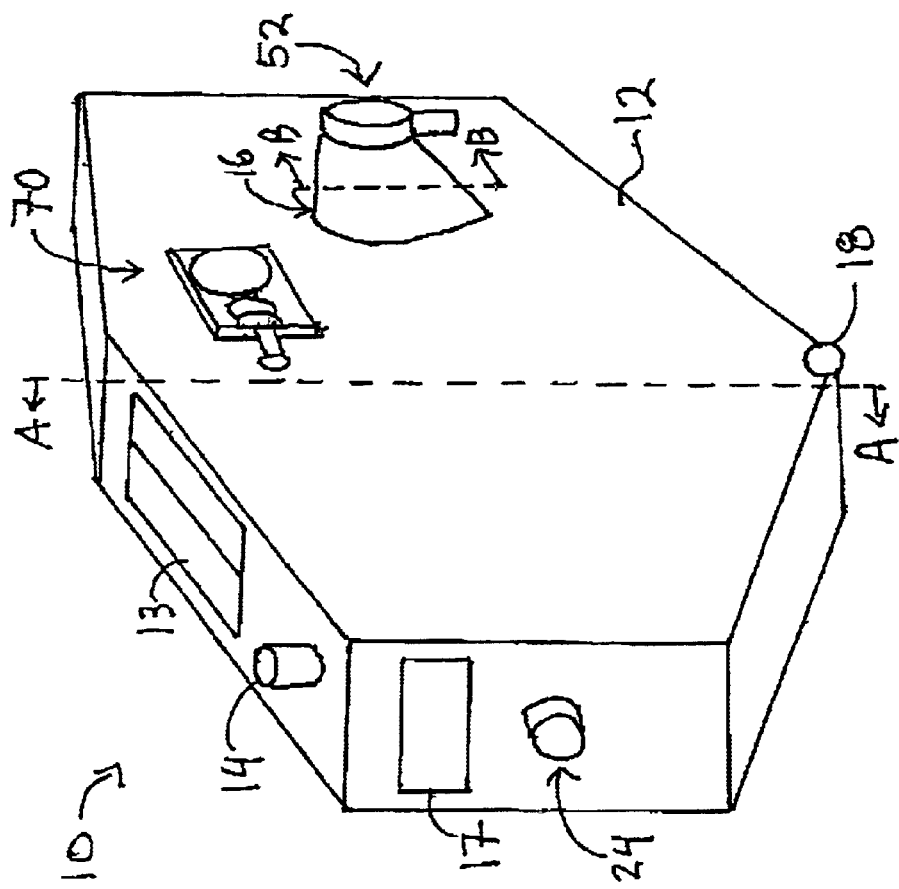
FIG. 1 is an isometric view of a solid and liquid separation device according to one embodiment of the invention.
Figure 2:
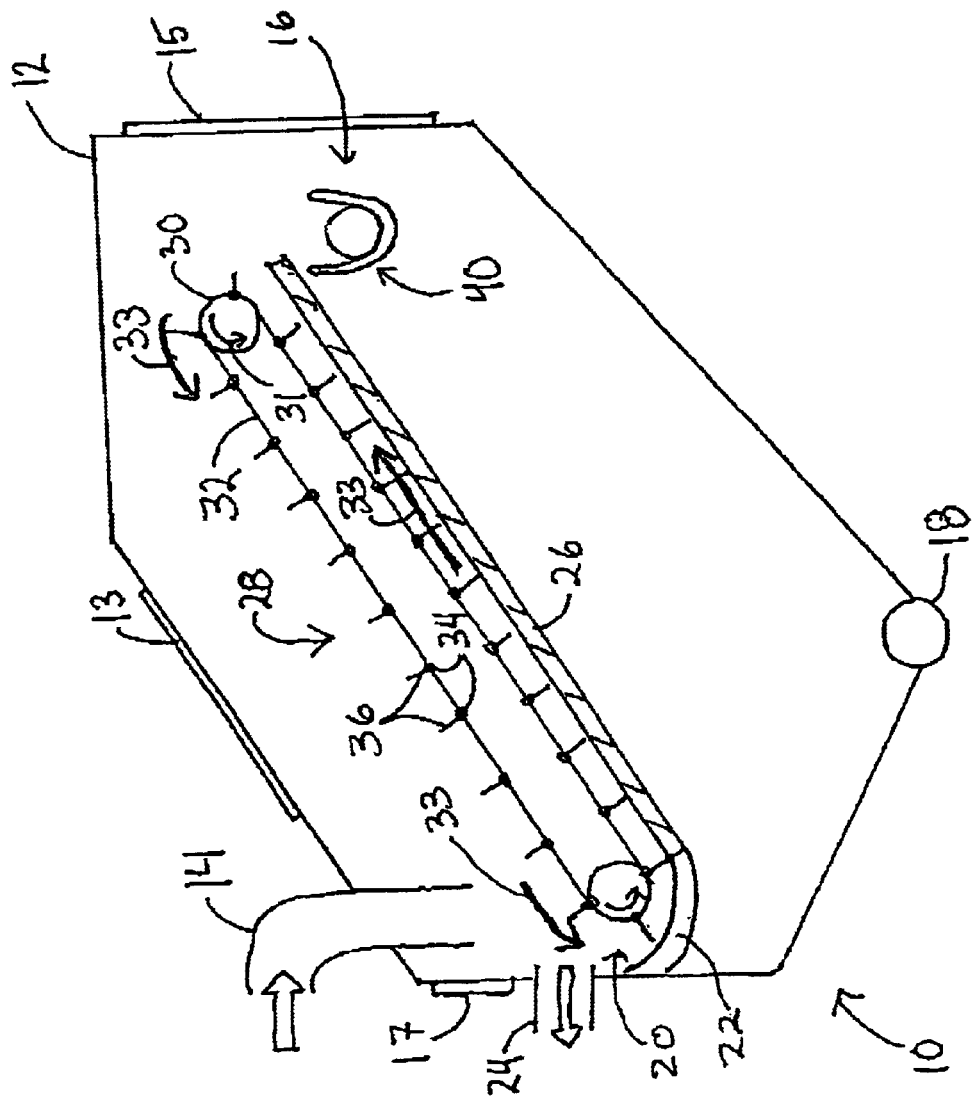
FIG. 2 is a sectional view along the line A—A in FIG. 1.

FIGS. 1 and 2 depicts a solid and liquid separation device 10 according to the invention. Device 10 comprises housing 12 having inlet 14, solid outlet 16 and liquid outlet 18. The floor of housing 12 is preferably angled down towards liquid outlet 18, forming a V-shape. Material comprising both liquid and solid components, such as manure, is introduced into device 10 through inlet 14 and falls into receiving area 20. Receiving area 20 is formed by screen support 22. Housing 12 may be provided with doors 13, 15 and 17 to facilitate maintenance and repair of device 10. Housing 12 may also have overflow outlet 24, located adjacent receiving area 20, to allow excess material to exit device 10. Excess material exiting device 10 may by reintroduced to device 10 through inlet 14.

Material in receiving area 20 is moved upwards along screen 26 towards upper end 27 by conveying assembly 28. Conveying assembly 28 comprises two rotation shafts 29, 30 around which are wound two drive members 32. Rotation shaft 30 is preferably connected to each side of housing 12 by a tension assembly 70, as described below with reference to FIG. 6. Rotation shafts 29, 30 are driven by a suitable means such as a motor (not shown) to rotate as indicated by arrows 31. Rotation shafts 29, 30 are preferably capable of being driven at a variety of different speeds so that the throughput of device 10 may be controlled. A plurality of connecting rods 34 are attached between drive members 32. Connecting rods 34 comprise scrapers 36. Scrapers 36 are positioned to scrape upwards along screen 26 as drive members 32 are rotated by rotation shafts 30 as indicated by arrows 33. A brushing assembly 90 may be positioned below screen 26 to remove solid components of material that become caught in screen 26, as shown in FIG. 7.

Figure 3:
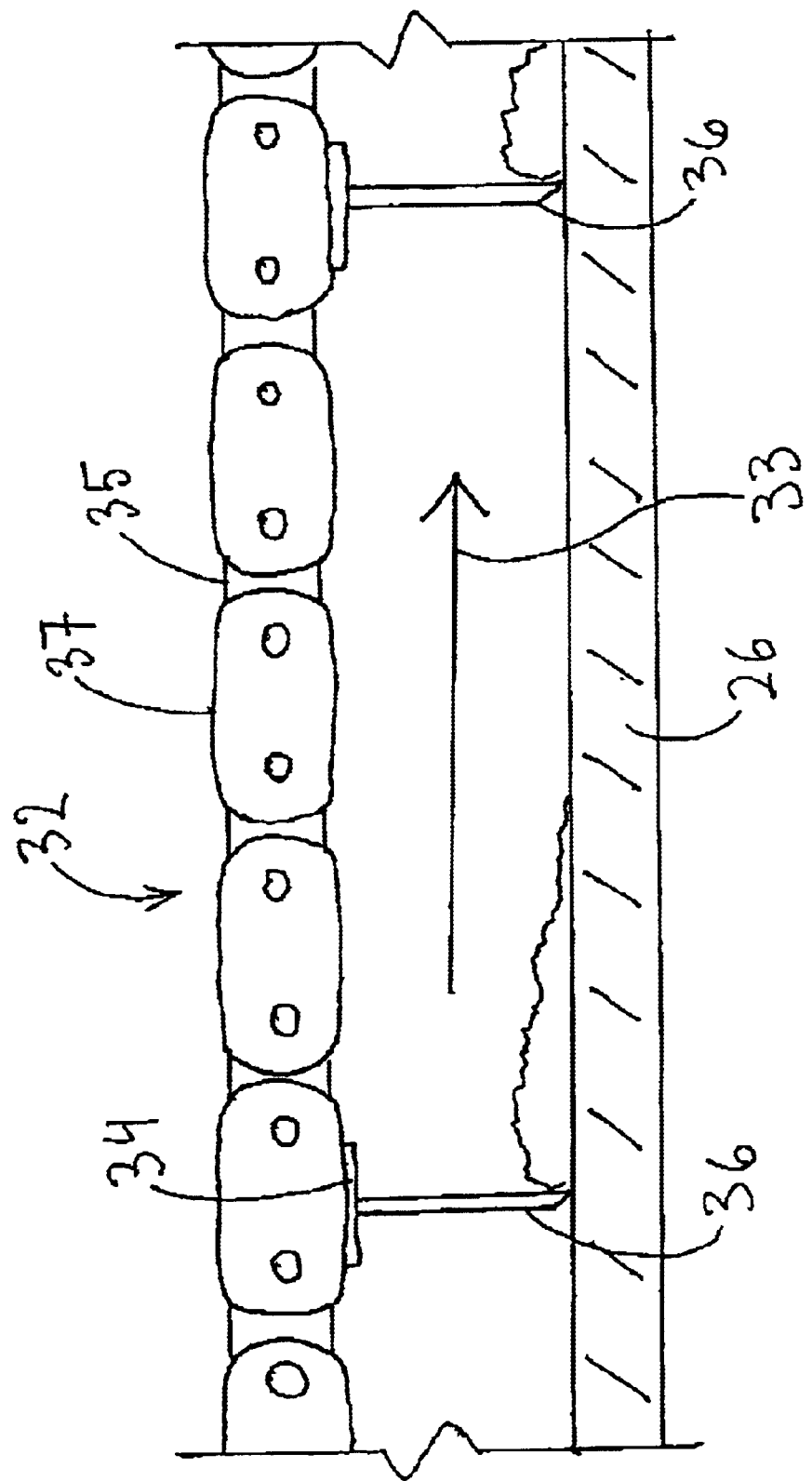
FIG. 3 is a close up view of a portion of the screen and conveying assembly of the device of FIG. 1.

FIG. 3 shows one of drive members 32 with scrapers 36 urging material along screen 26. Drive members 32 preferably comprise chains 35 made up of links 37, but it is to be understood that drive members 32 may take different forms. For example, drive members 32 may comprise belts.

Most of the liquid components of material fall through screen 26 as scrapers 36 urge material from receiving area 20 upwards along screen 26 to upper end 27. Liquid components of material falling through screen 26 collect in the lower portion of housing 10, and exit housing 10 through liquid outlet 18.

Figure 4:
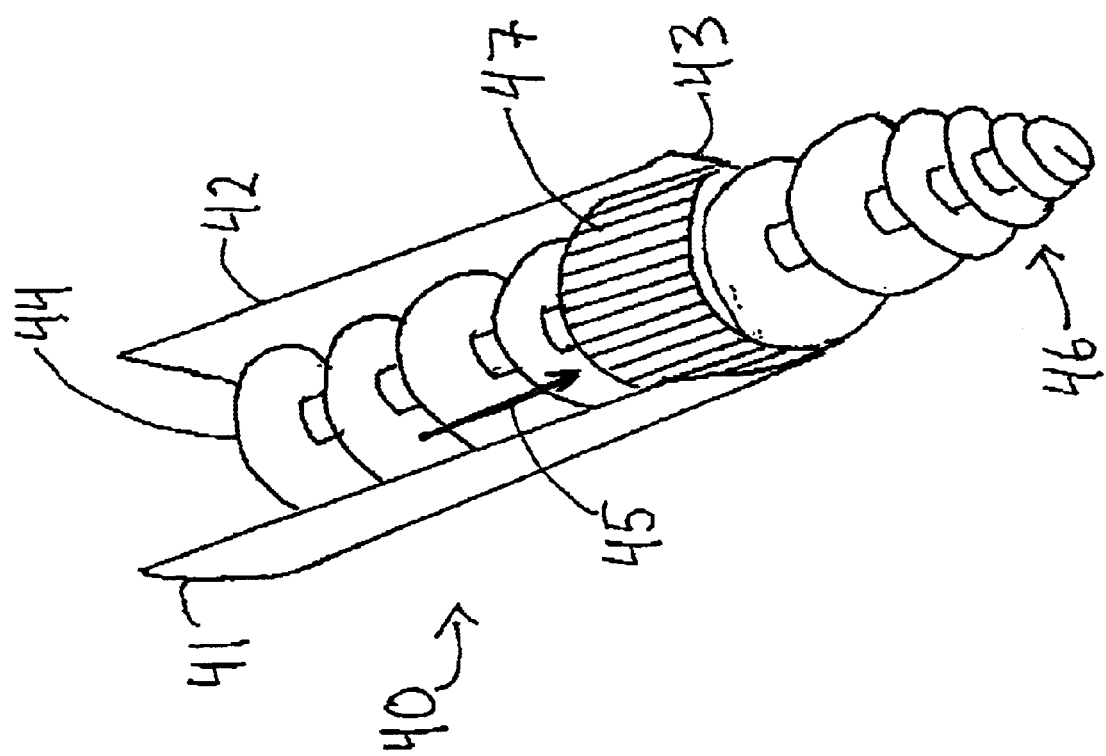
FIG. 4 is an isometric view of the squeeze assembly of the device of FIG. 1.

Scrapers 36 push material off upper end 27 of screen 26, causing material to fall into squeeze assembly 40. Material entering squeeze assembly 40 comprises mostly solid components, but may also comprise some liquid components. Squeeze assembly 40 is best described with reference to FIGS. 4 and 5.

Squeeze assembly 40 comprises a trough 42 with an auger 44 in the bottom thereof. Edges 41, 43 of trough 42 are attached to housing 10. Auger 44 is preferably driven to rotate by a power member such as a motor (not shown). The power member is preferably capable of driving auger 44 at a variety of speeds. Rotating auger 44 slower allows more moisture will escape from squeeze assembly 40, thereby producing drier solid components of material. Conversely, rotating auger 44 faster results in wetter solid components. Auger 44 may comprise tapered end 46 extending out of housing 10 through solid outlet 16 (not shown in FIG. 4). Material falling from upper end 27 of screen 26 into trough 42 is urged toward tapered end 46 as indicated by arrow 45.

Cylindrical screen 47 is fitted around auger 44 adjacent edge 43 of trough 42. Trough 42 defines drainage apertures (not shown) in the bottom thereof, to facilitate removal of liquid components of material from squeeze assembly 40.

Auger 44 comprises core 48 and blade 50. Blade 50 extends outward from core 48. Core 48 preferably becomes wider near tapered end 46. Blade 50 preferably does not extend as far outward from core 48 near tapered end 46.

Figure 5:
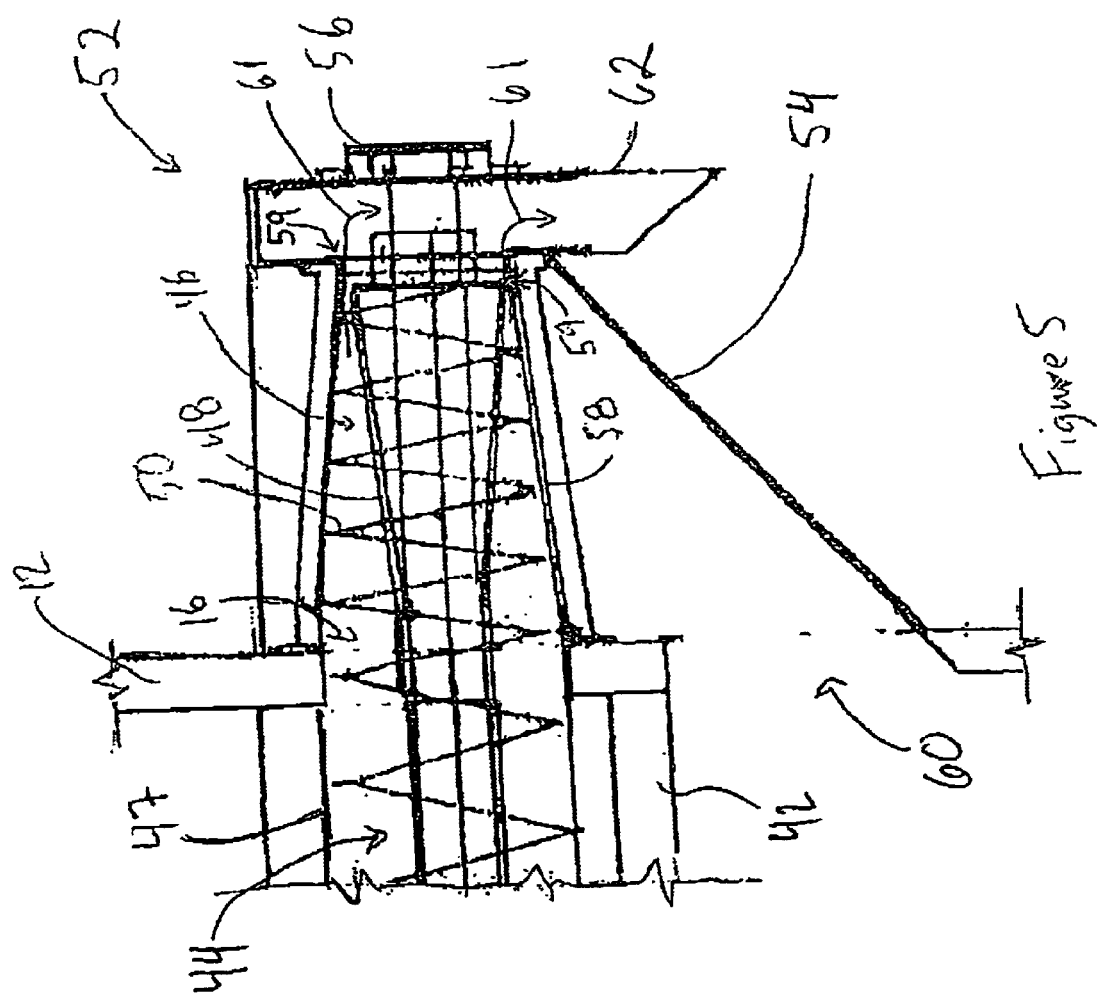
FIG. 5 a sectional view along the line B—B in FIG. 1.

As best seen in FIG. 5, auger cap 52 is attached to solid outlet 16 of housing 12. Auger cap 52 preferably comprises shell 54 and bearing assembly 56. The wider end of shell 54 is attached to housing 12 and the narrower end of shell 54 is attached to bearing assembly 56. Truncated conical screen 58 is positioned between bearing assembly 56 and housing 12 within shell 54. Truncated conical screen 58 is sized to fit over tapered end 46 of auger 44, forming gaps 59 between screen 50 and core 48. As auger 44 turns, material is pressed against truncated conical screen 58 as it is urged towards gaps 59. Liquid components of material fall through screen 58 to re-enter housing 12 through cap drainage opening 60. Solid components of material are forced through gaps 59 and fall out of cap 52 through solid discharge chute 62, as indicated by arrows 61.

Figure 6:
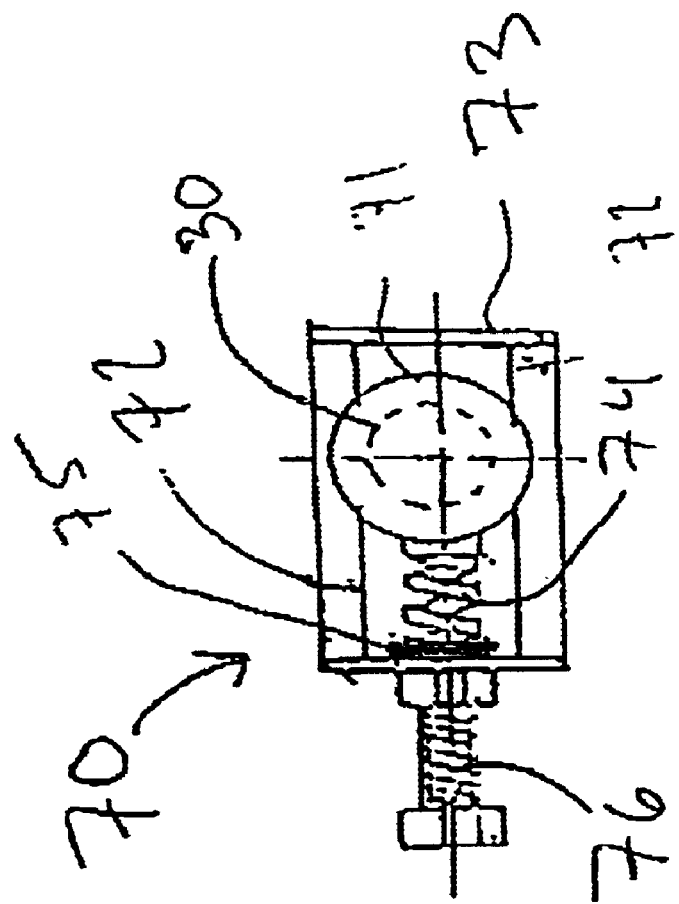
FIG. 6 is a close up view of a longitudinally flexible portion according to the invention.
Figure 7:
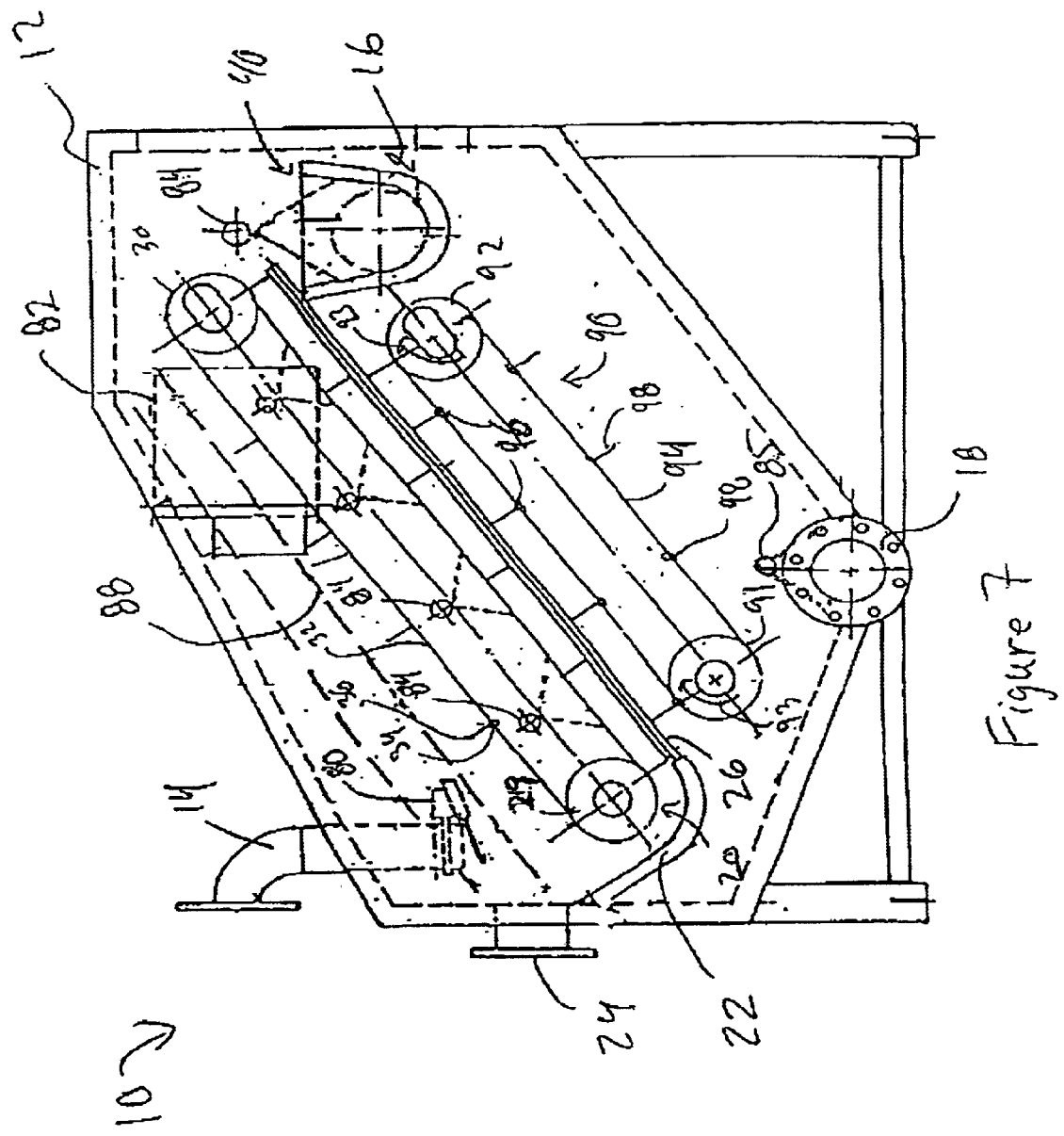
FIG. 7 is a sectional view similar to the view of FIG. 2 of another embodiment of the invention.

FIG. 6 depicts tension assembly 70. One tension assembly 70 is preferably attached to each side of housing 12, with rotation shaft 30 supported therebetween. Tension assembly 70 comprises bearing assembly 71 configured to rotatably accept rotation shaft 30. Bearing assembly 71 is slidingly coupled to tracks 72. Tracks 72 are attached to frame 73, which is attached to housing 12. Spring 74 is connected to bearing assembly 71 and abuts spring plate 75, which is attached to adjustment screw 76. Adjustment screw 76 is threaded through frame 73 so that the position of spring plate 75 relative to frame 73 may be adjusted.

Tension assemblies 70 are preferably attached to housing 12 with the heads of adjustment screws 76 pointing in the direction of rotation shaft 29. Springs 74 bias rotation shaft 30 away from rotation shaft 29 to maintain tension in drive members 32, even if drive members 32 become stretched or otherwise deformed through use. Adjustment screws 76 may be turned to adjust the tension in springs 74.

FIG. 7 depicts another embodiment of device 10 according to the invention. As shown in FIG. 7, sensor 80 may be positioned adjacent inlet 14. Sensor 80 is configured to produce an output signal indicative of whether material is coming into device 10 through inlet 14. Sensor 80 is operatively coupled to control panel 82. Control panel 82 is connected to activate a plurality of nozzles 84 to clean device 10 when the output signal from sensor 80 indicates that no material has come through inlet 14 for a predetermined period of time. Control panel 82 may also activate nozzles 84 to clean device 10 upon shut down of device 10.

Nozzles 84 are arranged so that when activated they spray liquid down on screen 26 and squeeze assembly 40 to rinse any remaining material from device 10. Liquid may be supplied to nozzles 84 by suitable means such as a standard garden hose or an industrial hose (not shown). Nozzles 84 may optionally be supplied with recycled liquid components of material after suitable treatment. Liquid sprayed from nozzles 84, along with the rinsed material, exits housing 12 through liquid outlet 18.

Outlet nozzle 85 may be positioned in housing 12 near liquid outlet 18. Outlet nozzle 85 is preferably configured to spray water through liquid outlet 18, thereby removing any solid components which may have accumulated in the bottom of housing 12. Outlet nozzle 85 is preferably controlled by control panel 82 in the same way as nozzles 84.

Figure 8:
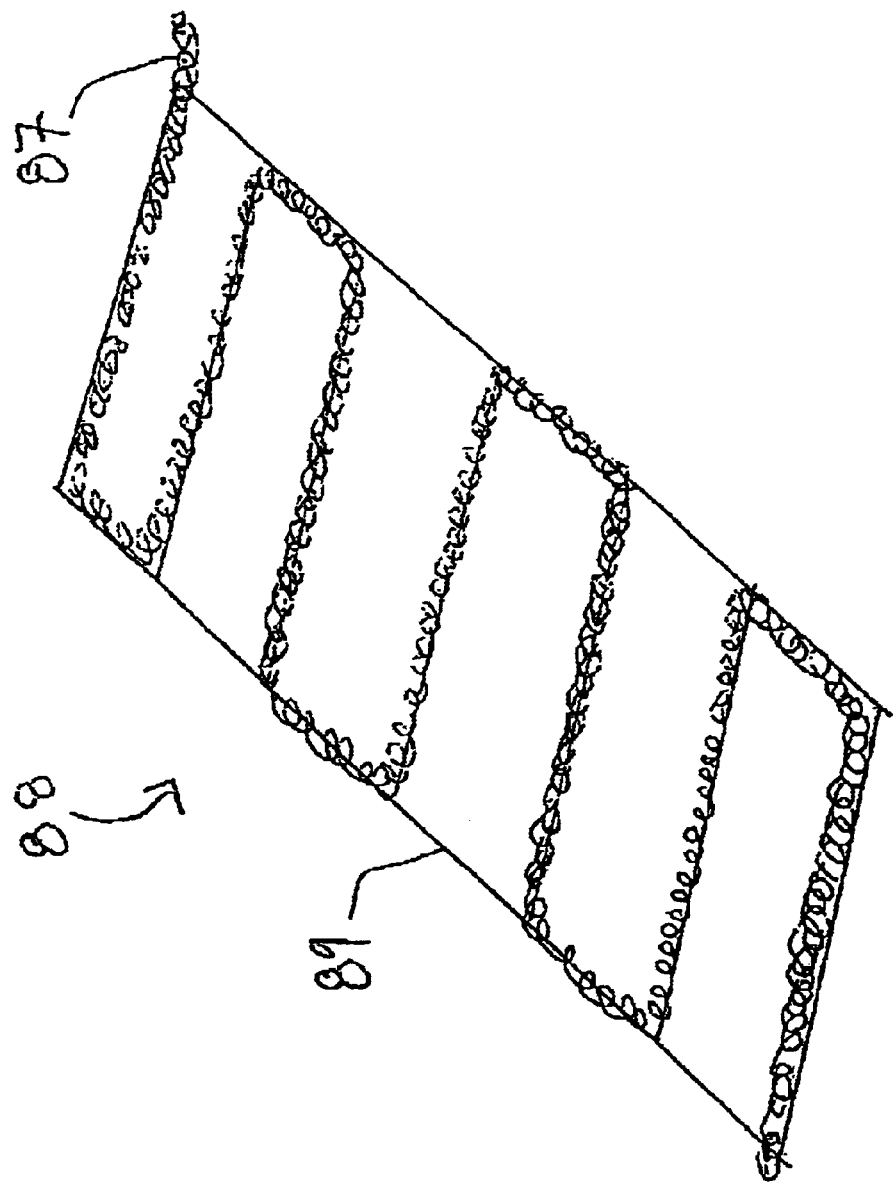
FIG. 8 is an isometric view of the heating assembly of FIG. 7.

Heating assembly 88 may be positioned in housing 12 above nozzles 84. Heating assembly 88, as shown in FIG. 8, preferably comprises heating cable 87 attached to frame 89. Heating assembly 88 may be controlled by control panel 82 to prevent the temperature inside housing 12 from dropping below a predetermined temperature. The predetermined temperature may be, for example, 0 degrees Celsius.

Brushing assembly 90 is preferably positioned in housing 12 below screen 26. Brushing assembly 90 preferably comprises two rotation shafts 91, 92 around which are wound two drive members 94. Like rotation shaft 30, rotation shaft 92 is preferably connected to housing 12 by tension assemblies 70, as described above. Rotation shafts 91, 92 may be driven by a suitable means such as a motor (not shown) to rotate as indicated by arrows 93. Alternately, rotation shafts 91, 92 may be connected to be driven by rotation shafts 29, 30, for example by a drive belt or gears (not shown). A plurality of connecting rods 96 are attached between drive members 32. Connecting rods 96 comprise brushes 98. Brushes 98 are positioned to contact screen 26 to remove any solid components of material caught up therein.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A solid and liquid separation device, comprising:
    (a) a housing, the housing having an inlet, a solid outlet and a liquid outlet, the liquid outlet located in a lower portion of the housing;
    (b) a screen located within the housing, the screen positioned above the liquid outlet at an inclined angle, wherein a lower end of the screen is directly below the inlet;
    (c) a conveying assembly, mounted in the housing located above the screen, and including two rotation shafts cooperating with two drive members, at least one of the rotation shafts connected to the housing by two tension assemblies, a plurality of connecting rods mounted between the two drive members, each connecting rod including a scraper, the scraper capable of contacting the screen for driving solids toward an upper end of the screen; and,
    (d) a squeeze assembly, including a trough for supporting solids falling from the upper end of the screen, the trough provided with an auger that is configured to be driven to rotate by a power member, the auger capable of outputting the solids toward the solid outlet.

2. The solid and liquid separation device of claim 1 wherein each tension assembly comprises a spring.

3. The solid and liquid separation device of claim 1 wherein each tension assembly comprises an adjustment screw.

4. The solid and liquid separation device of claim 1 wherein each tension assembly comprises a spring and an adjustment screw.

5. The solid and liquid separation device of claim 1 wherein the power member is capable of driving the auger at a plurality of different speeds of rotation.

6. The solid and liquid separation device of claim 1 further comprising a brushing assembly mounted in the housing located below the screen, the brushing assembly comprising two rotation shafts co-operating with two drive members, a plurality of connecting rods mounted between the two drive members, each connecting rod including a brush, the brush configured to remove solid components of material caught in the screen.

7. A solid and liquid separation device, comprising:
    (a) a housing, the housing having an inlet, a solid outlet and a liquid outlet, the liquid outlet located in a lower portion of the housing;
    (b) a screen located within the housing, the screen positioned above the liquid outlet at an inclined angle, wherein a lower end of the screen is directly below the inlet;
    (c) a conveying assembly, mounted in the housing located above the screen, and including two rotation shafts co-operating with two drive members, a plurality of connecting rods mounted between the two drive members, each connecting rod including a scraper, the scraper capable of contacting the screen for driving solids toward an upper end of the screen;
    (d) a squeeze assembly, including a trough for supporting solids falling from the upper end of the screen, the trough provided with an auger that is configured to be driven to rotate by a power member, the auger capable of outputting the solids toward the solid outlet;
    (e) a plurality of nozzles arranged for spraying liquid toward a top of the screen and toward the squeeze assembly;
    (f) a sensor configured to produce an output signal indicative of whether material is being introduced into the housing through the inlet; and,
    (g) a control panel configured to receive the output signal from the sensor, the control panel connected to activate the plurality of nozzles when the output signal indicates that no material has been introduced into the housing through the inlet for a predetermined period of time.

8. The solid and liquid separation device of claim 7 wherein at least one of the rotation shafts is connected to the housing by two tension assemblies.

9. The solid and liquid separation device of claim 8 wherein each tension assembly comprises a spring.

10. The solid and liquid separation device of claim 8 wherein each tension assembly comprises an adjustment screw.

11. The solid and liquid separation device of claim 8 wherein each tension assembly comprises a spring and an adjustment screw.

12. The solid and liquid separation device of claim 7 wherein the housing is provided with doors that may be opened and closed, for assembling, dismantling and maintenance of parts in the housing.

13. The solid and liquid separation device of claim 7 further comprising a heater mounted in the housing above the conveying assembly.

14. The solid and liquid separation device of claim 7 wherein the housing is provided with an overflow outlet, so that excessive material introduced into the housing through the inlet may be drawn out, and may be introduced again through the inlet.

15. The solid and liquid separation device of claim 7 wherein the housing comprises a generally V-shaped floor, and wherein the liquid outlet is located at the bottom of the generally V-shaped floor.

16. The solid and liquid separation device of claim 7 wherein the auger comprises a tapered end portion.

17. The solid and liquid separation device of claim 16 wherein the tapered end portion extends out of the housing through the solid outlet.

18. The solid and liquid separation device of claim 17 further comprising an auger cap attached to the housing, the auger cap positioned over the tapered end.

19. The solid and liquid separation device of claim 18 wherein the auger cap comprises a truncated conical screen fitted around the tapered end.

20. The solid and liquid separation device of claim 18 wherein the auger cap comprises a solid discharge chute.

21. The solid and liquid separation device of claim 7 wherein the power member is capable of driving the auger at a plurality of different speeds of rotation.

22. The solid and liquid separation device of claim 7 further comprising a brushing assembly mounted in the housing located below the screen, the brushing assembly comprising two rotation shafts co-operating with two drive members, a plurality of connecting rods mounted between the two drive members, each connecting rod including a brush, the brush configured to remove solid components of material caught in the screen.

* * * * *